(12) United States Patent
Nakamura

(10) Patent No.: US 10,372,385 B2
(45) Date of Patent: Aug. 6, 2019

(54) OPERATING MANAGEMENT SERVER FOR REMOTELY MANAGING PLURAL IMAGE FORMING APPARATUSES VIA NETWORK, TEST ENVIRONMENT CONSTRUCTION SYSTEM, AND TEST ENVIRONMENT CONSTRUCTION METHOD

(71) Applicant: KYOCERA Document Solutions Inc., Osaka (JP)

(72) Inventor: Takumi Nakamura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/992,188

(22) Filed: May 30, 2018

(65) Prior Publication Data

US 2018/0349066 A1 Dec. 6, 2018

(30) Foreign Application Priority Data

May 30, 2017 (JP) .................................. 2017-106446

(51) Int. Cl.
*G06F 3/12* (2006.01)
*G06F 11/22* (2006.01)
*G06F 9/4401* (2018.01)
*G06F 8/65* (2018.01)

(52) U.S. Cl.
CPC .......... *G06F 3/1203* (2013.01); *G06F 3/1296* (2013.01); *G06F 9/4411* (2013.01); *G06F 11/2289* (2013.01); *G06F 8/65* (2013.01)

(58) Field of Classification Search
None
See application file for complete search history.

(56) References Cited

U.S. PATENT DOCUMENTS 8,856,211 B1 * 10/2014 Kassamali .............. H04L 43/50
709/203
2012/0233116 A1 * 9/2012 Fukami ............. G06F 17/30174
707/620

FOREIGN PATENT DOCUMENTS

JP 2000-047535 A 2/2000

* cited by examiner

*Primary Examiner* — Thomas D Lee
(74) *Attorney, Agent, or Firm* — Hawaii Patent Services; Nathaniel K. Fedde; Kenton N. Fedde

(57) ABSTRACT

Provided is a management server that is used in constructing a high-quality test environment. The management server is an operating server that is connected via a network to an image forming apparatus registered as a management target, and that remotely manages the image forming apparatus. The management server includes a data-collection unit, a connection-receiving unit, and a data-relay unit. The data-collection unit receives collection-target data from the image forming apparatus and accumulates that data in a database. The connection-receiving unit receives a connection with a test sever having the same functions as self server. The data-relay unit also transmits the collection-target data received by the data-collection unit to the test server, the connection of which is received by the connection-receiving unit. Therefore, the collection-target data is accumulated in the test server in the same way as in the management server, and can be used as test data.

10 Claims, 5 Drawing Sheets

… (1)

OPERATING MANAGEMENT SERVER FOR REMOTELY MANAGING PLURAL IMAGE FORMING APPARATUSES VIA NETWORK, TEST ENVIRONMENT CONSTRUCTION SYSTEM, AND TEST ENVIRONMENT CONSTRUCTION METHOD

INCORPORATION BY REFERENCE

This application is based on and claims the benefit of priority from Japanese Patent Application No. 2017-106446 filed on May 30, 2017, the contents of which are hereby incorporated by reference.

BACKGROUND

The present disclosure relates to an operating management server that remotely manages plural image forming apparatuses via a network, a test environment construction system and a test environment construction method.

In recent years, remotely managing plural image forming apparatuses in a customer environment is being performed by a management server. As a result, even though a service technician is not dispatched, it is possible for the management server, via a network, to collect target data to be collected such as counter values and the like from an image forming apparatus in a customer environment, analyze the collected information, and maintain the image forming apparatus.

Typically, before performing software update of this kind of management server, a test environment is prepared, and the software to be updated is tested to make sure there are no problems. Normally, in order to prepare a test environment that is close to the real environment, actual data is copied from the management server database to a constructed test server, and prepared as test data.

SUMMARY

The management server according to the present disclosure is an operating management server that is connected via a network to an image forming apparatus that is registered as a management target, and that remotely manages the image forming apparatus. Furthermore, the management server includes a data-collection unit, a connection-receiving unit and a data-relay unit. The data-collection unit receives collection-target data from the image forming apparatus and accumulates that data in a database. The connection-receiving unit receives a connection with a test sever having the same functions as self server. The data-relay unit also transmits the collection-target data received by the data-collection unit to the test server, the connection of which is received by the connection-receiving unit.

The test environment construction system according to the present disclosure includes plural image forming apparatuses, a management server, a relay apparatus and a test server. The plural image forming apparatuses transmit collection-target data. The management server, via a network, remotely manages the plural image forming apparatuses that are registered as management targets. The management server is operating. The relay apparatus is provided in a communication path between each of the plural image forming apparatuses and the management server. The test server includes the same functions as the management server. Furthermore, each of the management server and the test server include a data-collection unit, an operation unit, and a command-processing unit. The data-collection unit receives the collection-target data from the image forming apparatuses and accumulates the data in respective databases. The operation unit receives control instructions for the image forming apparatuses. The command-processing unit, together with transmitting commands to the image forming apparatuses based on the control instructions received by the operation unit, receives responses to the commands from the image forming apparatuses. The relay apparatus includes a connection-receiving unit, a data-relay unit, and a command-relay unit. The connection-receiving unit receives a connection with the test server. The data-relay unit transmits the collection-target data that is transmitted from each of the plural image forming apparatuses to the test server, the connection of which is received by the connection-receiving unit. The command-relay unit, together with relaying the commands for the image forming apparatuses that are transmitted from the test server, the connection of which is received by the connection-receiving unit, transmits the responses to the commands by the relaying received from the image forming apparatus to the test server, the connection of which is received by the connection-receiving unit.

The test environment construction method according to the present disclosure is by an operating management server that is connected via a network to an image forming apparatus that is registered as a management target, and remotely manages the image forming apparatus. The management server receives collection-target data from the image forming apparatus and accumulates that data in a database, receives a connection for a test server that includes the same functions as self server, and transmits the received collection-target data to the test server, the connection of which is received.

DETAILED DESCRIPTION

In the following, embodiments according to the present disclosure will be explained in detail with reference to the drawings. In addition, in the embodiments described below, the same reference numbers will be used for configuration that illustrates similar function.

Figure 1:
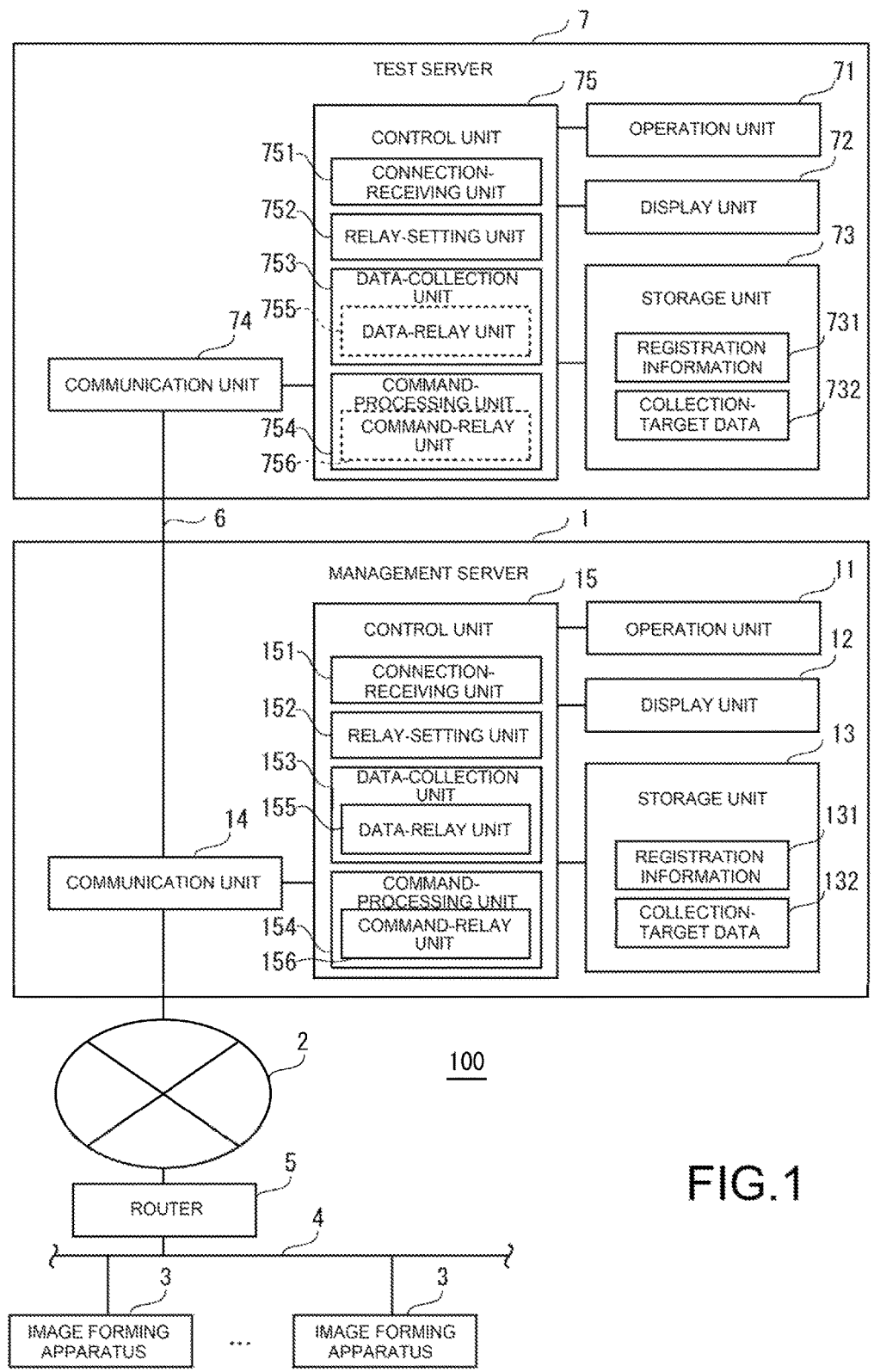
FIG. 1 is a functional block diagram schematically illustrating the configuration of a test environment construction system of an embodiment according to the present disclosure.

As illustrated in FIG. 1, the test environment construction system 100 of this embodiment includes a test server 7, a management server 1 and plural image forming apparatuses 3. The test server 7 is constructed as a test environment. The management server 1 remotely manages image forming apparatuses 3 that are registered in registration information 131 as management targets. The plural image forming apparatuses 3 form a customer environment. The management server 1 and the plural image forming apparatuses 3 operate as a real environment. The management server 1 is connected via a network 2 such as the Internet or the like to one or more image forming apparatuses 3, which are the plural image forming apparatuses 3 registered in the registration information 131 as management targets. The test server 7 is connected to the management server 1 via a network 6 with a wired or wireless connection. The test server 7 may also be connected to the management server 1 via the network 2.

The image forming apparatuses 3 are printers, copiers, MFPs and the like, and are connected to a customer environment network 4 such as a LAN and the like. Image forming apparatuses 3 that are management targets of the management server 1 are connected to the management server 1 via the network 4, a router 5 and the network 2, and transmit and receive various kinds of data to and from the management server 1. For example, an image forming apparatus 3 transmits collection target data 132 such as error information, counter values such as the number of prints and the like, the toner level and the like to the management server 1. Moreover, when a remote command is transmitted from the management server 1, an image forming apparatus 3 performs operation control based on the remote command and transmits command execution results as a response to the remote command to the management server 1.

The management server 1 includes an operation unit 11, a display unit 12, a storage unit 13, a communication unit 14 and a control unit 15.

The operation unit 11 is an input unit such as a keyboard, mouse, and the like, and is a user interface. The display unit 12 is a monitor such as a liquid-crystal display or the like, and displays various information.

The storage unit 13 is a storage unit such as a semiconductor memory, HDD (Hard Disk Drive) and the like, and stores registration information 131 that is registered a management-target image forming apparatus 3, and collection-target data 132 that is transmitted from a management-target image forming apparatus 3. A serial number and model name that identify the management-target image forming apparatus 3, and network information such as an IP address and the like are registered in the registration information 131. The registration information 131 and the collection-target data 132 may be accumulated in a database.

The communication unit 14 transmits and receives various kinds of data to and from a management-target image forming apparatus 3 via the network 2 and the router 5. Moreover, the communication unit 14 is connected to the test server 7 via the network 6 using a wired or wireless connection, and transmits and receives various data to and from the test server 7.

The control unit 15 is an information-processing unit such as a microcomputer or the like that includes a ROM (Read Only Memory), a RAM (Random Access Memory), a CPU (Central Processing Unit) and the like. A control program for performing operation control of an image forming apparatus 3 is stored in the ROM. By reading the control program that is stored in the ROM, and expanding that control program in the RAM, the CPU of the control unit 15 performs overall control of the apparatus according to specific instruction information that is inputted from the operation unit 11. Furthermore, the control unit 15 functions as a connection-receiving unit 151, a relay-setting unit 152, a data-collecting unit 153, and a command-processing unit 154.

The connection-receiving unit 151 has a function for receiving the connection with the test server 7 via the communication unit 14. After the connection-receiving unit 151 receives the connection with the test server 7, the management server 1 is able to communicate with the test server 7.

The relay-setting unit 152 receives settings for activating or deactivating the function of the data-relay unit 155 and command-relay unit 156, as described later, respectively. For example, the relay-setting unit 152 may receive settings for activating or deactivating by performing editing or the like of configuration files related to the data-relay unit 155 and command-relay unit 156.

Moreover, the case will be explained in which the relay-setting unit 152 receives a setting for activating the function of the data-relay unit 155 or command-relay unit 156 in a state in which the connection with the test server 7 is received by the connection-receiving unit 151. In this case, the relay-setting unit 152 transmits registration information 131, which is registered an image forming apparatus 3 for the management target, to the test server 7 via the communication unit 14. As a result, the test server 7 can register a management-target image forming apparatus 3 in the registration information 731 that the test server 7 holds. In addition, the case will be explained in which a setting to deactivate the function of the data-relay unit 155 or command-relay unit 156 is received. In this case, the relay-setting unit 152, by the communication unit 14, transmits a registration-cancellation-request notification to the test server 7 received by the connection-receiving unit 151 for requesting that registration of an image forming apparatus 3 that is registered in the test server 7 as a management target be cancelled.

Incidentally, the management server 1 has a registration-processing unit for registering each image forming apparatus 3 that is a management target in the registration information 131. The registration-processing unit, based on registration information that is transmitted by the relay-setting unit 152, registers image forming apparatuses 3 that are management targets in the registration information 131 in the storage unit 13 of self server. Moreover, when a registration-cancellation-request notification is transmitted from the relay-setting unit 152, the registration-processing unit has function of cancelling the registration of the management-target image forming apparatus 3 from the registration information 131 in the storage unit 13 of self server. This is also true of the test server 7.

The data-collection unit 153 has a function for receiving collection-target data 132 from a management-target image forming apparatus 3 via the communication unit 14, and accumulating that data in the storage unit 13.

The command-processing unit 154 receives a control instruction that is inputted by the manager using the operation unit 11. Then, the command-processing unit 154 has a function that, based on the received control instruction, transmits a command to the management-target image forming apparatus 3 via the communication unit 14, and via the communication unit 14, receives command execution results as a response from the image forming apparatus 3.

The data-relay unit 155 is provided in the data-collection unit 153. The data-relay unit 155 is set by the relay-setting unit 152 to be activated, and the data-collection unit 153 also transmits collection-target data 132 from the image forming apparatus 3 received by the communication unit 14 to the test server 7. In other words, when the data-relay unit 155 is activated, the collection-target data 132 that is transmitted from the image forming apparatus 3 is processed by the data-relay unit 155 so as to be transmitted from the image forming apparatus 3 to both the management server 1 and the test server 7. When the data-relay unit 155 is set by the relay-setting unit 152 to be deactivated, the collection-target data 132 from the image forming apparatus 3 that the data-collection unit 153 receives by the communication unit 14 is not transmitted to the test server 7. In other words, when the data-relay unit 155 is deactivated, the data-collection unit 153 only performs normal processing of accumulating the collection-target data 132 that is transmitted from the image forming apparatus 3 in the storage unit 13.

The command-relay unit 156 is provided in the command-processing unit 154. When the command-relay unit 156 is set by the relay-setting unit 152 to be activated, the command-relay unit 156 receives a command that is transmitted from the test server 7 to a management-target image forming apparatus 3 by the communication unit 14, and transmits that command to the image forming apparatus 3 that is the transmission destination as a proxy. This is because the test server 7 is connected to the management server 1, however is not connected to the management-target image forming apparatus 3. Then, when the command-relay unit 156, by the communication unit 14, receives a command execution result as a response from this image forming apparatus 3, and that is recognized as a command response by proxy transmission, the command-relay unit 156 determines that relaying the response to the test server 7 is necessary, and transmits the response to the test server 7. When a response is not a response to a command by the test server 7, or in other words, in the case of a response to a command based on a control instruction that is inputted by the manager via the operation unit 11, the command-relay unit 156 determines that relaying the response to the test server 7 is not necessary, and does not transmit the response to the test server 7.

The test server 7 is constructed as a test environment for verifying software updates for the management server 1 and has the same functions as the management server 1, including an operation unit 71, a display unit 72, a storage unit 73, a communication unit 74 and a control unit 75. Moreover, the control unit 75 functions as each of a connection-receiving unit 751, a relay-setting unit 752, a data-collection unit 753, a command-processing unit 754, a data-relay unit 755, and a command-relay unit 756. The operation unit 71, the display unit 72, the storage unit 73, the communication unit 74 and the control unit 75 of the test server correspond to the operation unit 11, the display unit 12, the storage unit 13, the communication unit 14 and the control unit 15 of the management server 1, respectively. Moreover, the connection-receiving unit 751, the relay-setting unit 752, the data-collection unit 753, the command-processing unit 754, the data-relay unit 755, and the command-relay unit 756 correspond to the connection-receiving unit 151, the relay-setting unit 152, the data-collection unit 153, the command-processing unit 154, the data-relay unit 155, and the command-relay unit 156, respectively, so an explanation of these units will be omitted here. However, at the time when the test server 7 is constructed, there are no management-target image forming apparatuses 3 registered in the registration information 731 of the test server 7, and the collection-target data 132 is also in a state of not being accumulated in the storage unit 73. Furthermore, the relay settings of the data-relay unit 755 and command-relay unit 756 of the test server 7 are set to be inactivated. In FIG. 1, the case of being set to be inactivated is indicated by a dashed line, and the case of being set to be activated is indicated by a solid line.

Figure 2:
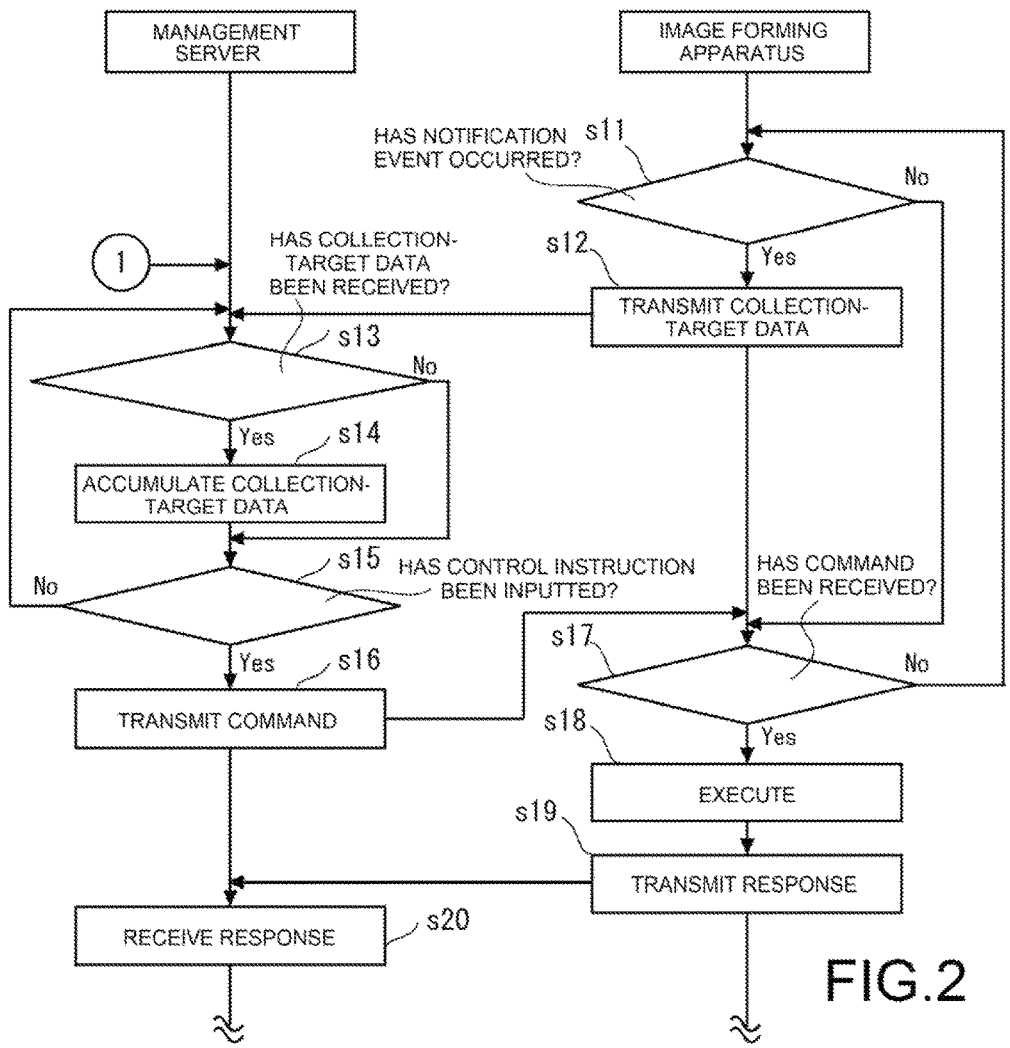
FIG. 2 is a flowchart illustrating the flow of processing by the management server and image forming apparatus, excluding the test server, in the test environment construction system illustrated in FIG. 1.

Next, the flow of processing by the management server 1 and an image forming apparatus 3 in the normal operating state, which is when the test server 7 is not connected to the management server 1, will be explained with reference to FIG. 2.

The image forming apparatus 3 determines whether or not a notification event for the management server 1 has occurred, such as a regular report of trouble occurrence and counter values, a reduction in the toner level and the like (step S11). Then, when a notification event has occurred (step S11: YES), the image forming apparatus 3 transmits collection-target data 132 such as error information, counter values, toner levels, and the like to the management server 1 (step S12). When a notification event has not occurred, processing advances to step S17.

The data-collection unit 153 of the management server 1 determines whether or not the collection-target data 132 from the image forming apparatus 3 has been received by the communication unit 14 (step S13). Then, when the collection-target data 132 has not been received (step S13: NO), processing advances to step S15. When the collection-target data 132 has been received (step S13: YES), the data-collection unit 153 accumulates the collection-target data 132 in the storage unit 13 (step S14). Continuing, the command-processing unit 154 determines whether or not a control instruction has been inputted by the manager via the operation unit 11 (step S15). Then, when a control instruction has not been inputted (step S15: NO), processing returns to step S13. When a control instruction has been inputted (step S15: YES), the command-processing unit 154, based on the inputted control instruction, transmits a command to the image forming apparatus 3 via the control unit 14 (step S16).

When a command is received from the management server 1 (step S17: YES), the image forming apparatus 3 executes the command (step S18), and transmits the command execution result to the management server 1 as a response (step S19). Continuing, the command-processing unit 154 of the management server 1 receives the response to the command from the image forming apparatus 3 via the communication unit 14 (step S20). When the image forming apparatus 3 does not receive a command (step S17: NO), processing returns to step S11. This processing is repeatedly executed by the management server 1 during operation and image forming apparatus 3.

Figure 3:
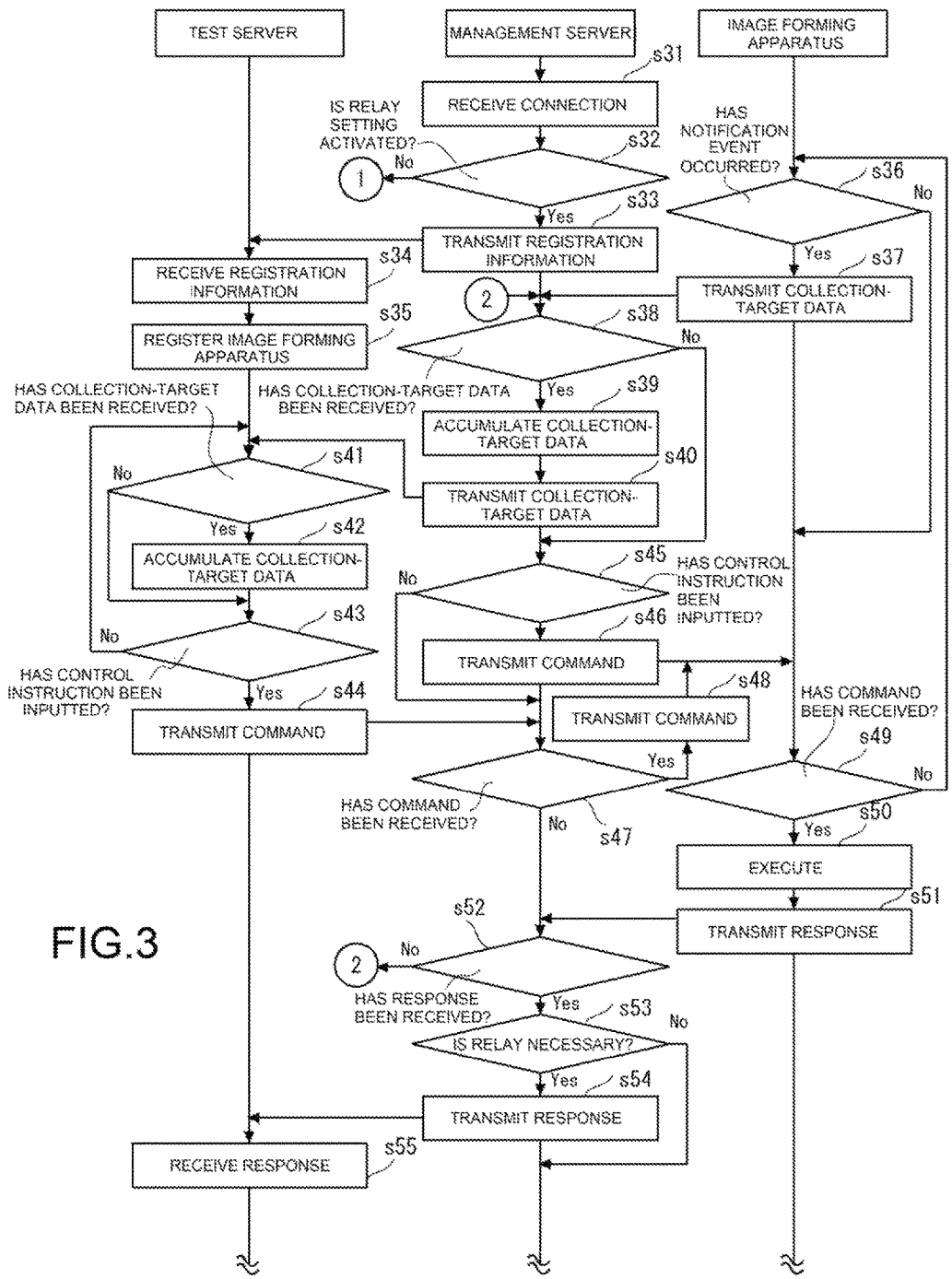
FIG. 3 is a flowchart illustrating the flow of processing, including the test server, in the test environment construction system illustrated in FIG. 1.

Next, the flow of processing when constructing a test environment by connecting the test server 7 to the management server 1 will be explained with reference to FIG. 3. Incidentally, here it is presumed that the relay settings of the data-relay unit 155 and the command-relay unit 156 of the management server 1 are set to activated, and that the relay settings of the data-relay unit 755 and command-relay unit 756 of the test server 7 are set to deactivated.

When the connection-receiving unit 151 of the management server 1 receives a connection with the test server 7 (step S31), the relay-setting unit 152 of the management server 1 determines whether or not the relay setting of the data-relay unit 155 or the command-relay unit 156 is activated (step S32). When the relay setting is not activated (step S32: NO), the management server 1 is the same as in the normal operating state, and each process is performed according to the flowchart illustrated in FIG. 2.

On the other hand, when the relay setting of the data-relay unit 155 or the command-relay unit 156 is set to be activated (step S32: YES), the relay-setting unit 152 transmits the registration information 131 to the test server 7 (step S33). After receiving the registration information 131 (step S34), the registration-receiving unit of the test server 7 registers the management-target image forming apparatus 3 in the registration information 731 based on the received registration information 131 (step S35). As a result, the image forming apparatus 3 that is a management target of the management server 1 is also registered in the test server 7.

In the image forming apparatus 3, as in normal operation, when a notification event occurs (step S36: YES), collection-target data 132 is transmitted to the management server 1 (step S37). The case will be explained in which, in the management server 1, the data-collection unit 153 receives collection-target data 132 from the image forming apparatus 3 by the communication unit 14 (step S38: YES) in a state in which the relay setting is set to activated. In this case, the data-collection unit 153, together with accumulating the collection-target data 132 in the storage unit 13 (step S39), the data-relay unit 155 also transmits the collection-target data 132 that is received by the data-collection unit 153 to the test server 7 (step S40).

As in the case of the management server 1, the test server 7 determines whether or not the data-collection unit 753 has received the collection-target data 132 by the communication unit 74 (step S41). Then, when the collection-target data 132 is not received (step S41: NO), processing advances to step S43. When the data-collection unit 753 receives collection-target data 132 (step S41: YES), that data is accumulated in the storage unit 73 as collection-target data 732 (step S42).

Continuing, as in the case of the management server 1, the test server 7 determines whether or not a control instruction has been inputted by the manager via the operation unit 71 (step S43). Then, when a control instruction has not been inputted (step S43: NO), processing returns to step S41. When a control instruction has been inputted (step S43: YES), the command-processing unit 154 transmits a command to the image forming apparatus 3 (step S44). Incidentally, even though the test server 7 has information related to the management-target image forming apparatus 3, the test server 7 is not connected to the image forming apparatus 3, but is connected to the management server 1. Therefore, commands for the image forming apparatus 3 that are transmitted from the test server 7 are received by the communication unit 14 of the management server 1.

In the management server 1 as well, whether or not a control instruction has been inputted by the manager via the operation unit 11 is determined (step S45). Then, when a control instruction has not been inputted (step S45: NO), processing advances to step S47. When a control instruction has been inputted (step S45: YES), the command-processing unit 154, based on the control instruction, transmits a command to the image forming apparatus 3 by the communication unit 14 (step S46). The management server 1 is connected to the management-target image forming apparatus 3, so the command that is transmitted by the command-processing unit 154 is received by the image forming apparatus 3.

Continuing, the command-relay unit 156 of the management server 1 determines whether or not the command for the image forming apparatus 3 from the test server 7 has been received by the communication unit 14 (step S47). Then, when the command has been received (step S47: YES), the command-relay unit 156 relays (proxy transmission) the command to the image forming apparatus 3 (step S48). When a command has not been received (step S47: NO), the command-relay unit 156 determines whether or not a response has been received from the image forming apparatus 3 by the communication unit 14 (step S52), and when a response has not been received (step S52: NO), processing returns to step S38.

The image forming apparatus 3 determines whether or not a command has been received from the management server 1 (step S49). Then, when a command has not been received (step S49: NO), processing returns to S36. When a command has been received (step S49: YES), the image forming apparatus 3 executes the received command (step S50), and transmits the execution result of the command to the management server 1 as a response (step S51).

The case will be explained in which the management server 1 receives a response from the image forming apparatus 3 (step S52: YES). The command-relay unit 156 of the management server 1 identifies whether or not the received response is a response to a command from the test server 7, and determines whether or not relaying the response to the test server 7 is necessary (step S53). When the response is recognized as being a response that is received for a command from the test server 7, the command-relay unit 156 determines that relaying the response is necessary (step S53: YES). Then, the command-relay unit 156 transmits the response from the image forming apparatus 3 to the test server 7 (step S54). The test server 7 receives a response from the image forming apparatus 3 via the management server 1 (step S55). On the other hand, when the command-relay unit 156 recognizes that a response to a command is received from self server, the command-relay unit 156 determines that relaying the response to the test server 7 is not necessary (step S53: NO). In this case, the response for the command is stored in the management server 1. The management server 1 repeats the process from step S38 to step S54 while the relay setting is activated.

In this way, the management server 1 is connected via a network 2 to an image forming apparatus 3 that is registered as a management target, is an operating management server 1 that remotely manages the image forming apparatus 3, and includes a data-collection unit 153 that receives collection-target data 132 from the image forming apparatus 3 and accumulates that data in a database, a connection-receiving unit 151 that receives a connection with a test server 7 that includes the same function as self server, and a data-relay unit 155 that also transmits the collection-target data 132 that is received by the data-collection unit 153 to the test server 7, the connection of which is received by the connection-receiving unit 151. Therefore, it is not necessary to manually transfer collection-target data 132 of the management server 1 to the test server 7, and it is possible to accumulate collection-target data in the test server 7 in the same way as the management server 1 and to use that data as test data. Moreover, while the test server 7 is connected to the management server 1 and the relay setting is activated, collection-target data 732 continues to be accumulated in the test server 7, so testing is possible based on the most recent accumulation state. Therefore, it is possible to construct a high-quality test environment.

Incidentally, the test server 7 is constructed after the management server 1, so the syntax (syntax rules) of the data that is transmitted and received by the data-collection unit 753 and the command-processing unit 754 and the like may differ from the management server 1. Therefore, the syntax of the test server 7 may be given to the management server 1, and a syntax-conversion unit may be provided. A command for the image forming apparatus 3 from the test server 7 may be converted to the syntax of the management server 1 by the syntax-conversion unit. Collection-target data 132 from the image forming apparatus 3, or a command execution result that is transmitted as a response may also each be converted to the syntax of the test server 7 by the syntax-conversion unit. As a result, the differences in the syntax rules are absorbed by the management server 1, so communication between the test server 7 and the image forming apparatus 3 can be tested with compatibility. A syntax-conversion unit may be provided in each of the data-collection unit 153 and the command-processing unit 154, and may also be provided in the communication unit 14.

Figure 4:
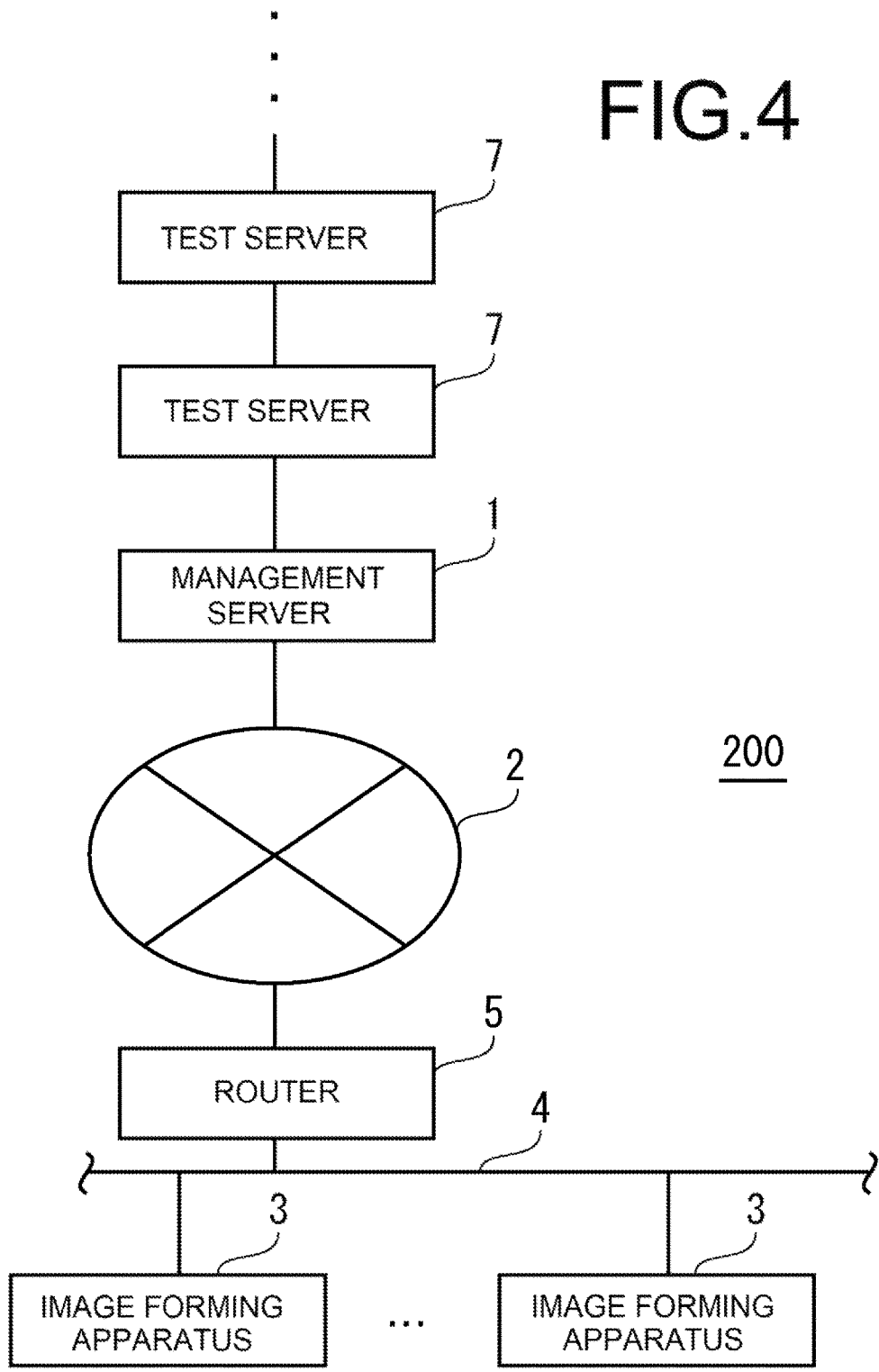
FIG. 4 is another system configuration diagram of a test environment construction system.

As in the test environment construction system 200 illustrated in FIG. 4, a test server 7 that is directly connected to the management server 1 may be taken to be a first test server 7, and a second test server 7 may be connected to the connection-receiving unit 751 of the first test server 7. In this case, by activating the relay settings of the data-relay unit 755 and the command-relay unit 756 of the first test server 7, collection-target data 132 is transmitted to the second test server 7 by the data-relay unit 755 of the first test server 7, and accumulated. The collection-target data 132 may also be data that is received from the management server 1 by the data-collection unit 753 of the first test server 7. Moreover, a command that is transmitted from the command-processing unit 754 of the second test server 7 is relayed to the management server 1 by the command-relay unit 756 of the first test server 7 and then transmitted from the management server 1 to the image forming apparatus 3. Then, a response to the command from the second test server 7 that is transmitted from the image forming apparatus 3 passes through the command-relay unit 156 of the management server 1 and the command-relay unit 756 of the first test server 7, and is received by the command-relay unit 756 of the second test server 7. In this way, plural test servers 7 are connected in multiple stages to an operating management server 1. As a result, collection-target data 132 that is transmitted from one image forming apparatus 3 can be accumulated in not only the operating management server 1, but also in one or more test server 7. Moreover, the collection-target data 132 from an image forming apparatus 3 can also be remotely controlled from plural test servers 7.

Figure 5:
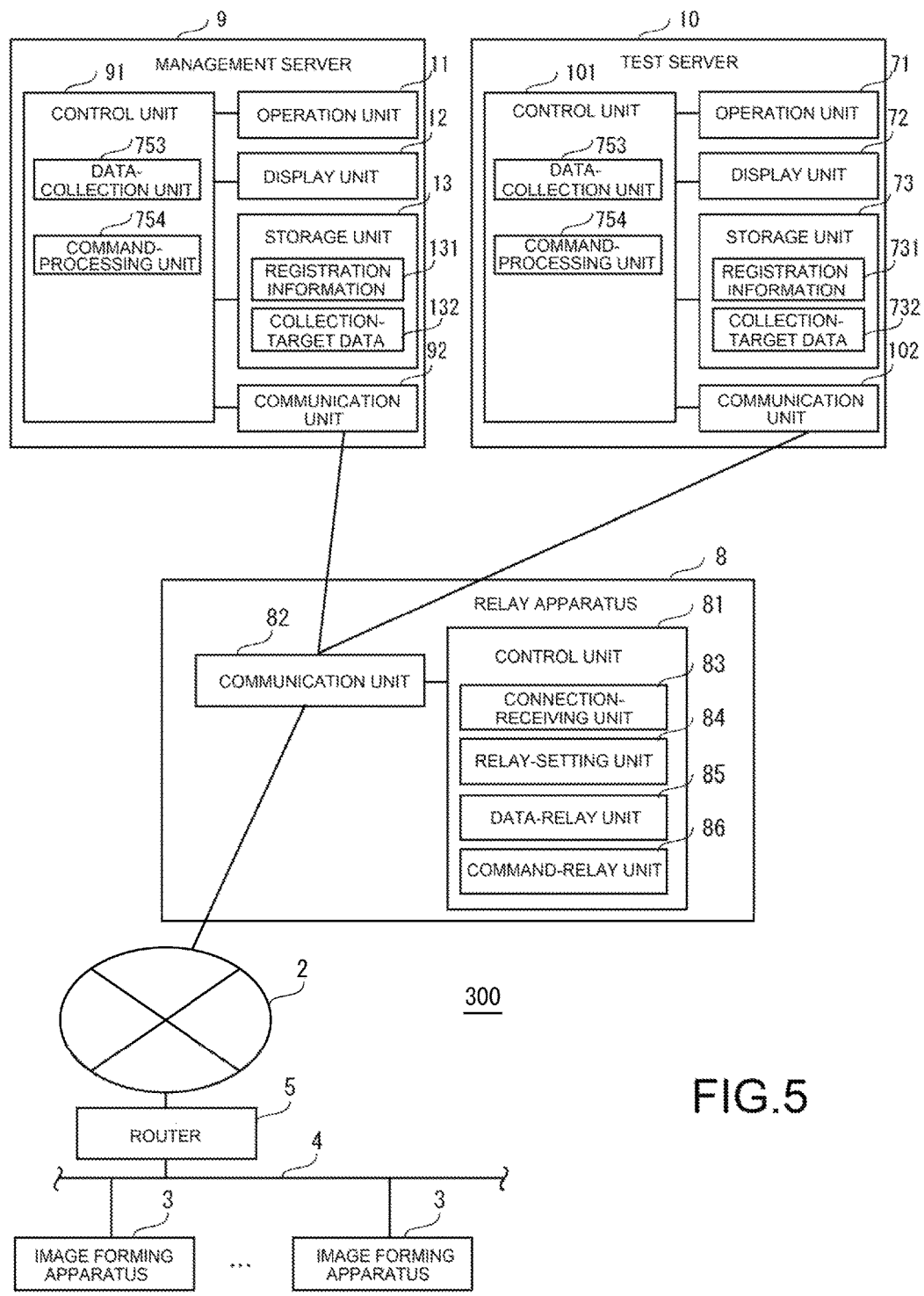
FIG. 5 is another system configuration diagram of a test environment construction system.

Furthermore, as in the test environment construction system 300 illustrated in FIG. 5, a relay apparatus 8 may be provided in the communication path between the management server 9 and each of the plural management-target image forming apparatuses 3. The relay apparatus 8 may be provided with the function of a connection-receiving unit 83, a relay-setting unit 84, a data-relay unit 85 and a command-relay unit 86. The connection-receiving unit 83, the relay-setting unit 84, the data-relay unit 85 and the command-relay unit 86 of the relay apparatus 8 correspond to the connection-receiving units 151, 751, the relay-setting units 152, 752, the data-relay units 155, 755, and the command-relay units 156, 756 of the management server 1 and test server 7 explained above, respectively. Therefore, in FIG. 4, a connection-receiving unit 151, a relay-setting unit 152, a data-relay unit 155 and a command-relay unit 156 are not provided in the management server 9 that corresponds to the management server 1. The same is also true for the test server 10 that corresponds to the test server 7.

The relay apparatus 8, by a communication unit 82, relays data such as collection data 132, commands, responses and the like that are transmitted and received between the management server 9 and each of the plural management-target image forming apparatuses 3. Then, together with the connection-receiving unit 83 receiving a connection with the test server 10, the relay-setting unit 84 receives settings for activating the relay settings for the data-relay unit 85 and the command-relay unit 86. In this case, the data-relay unit 85 of the relay apparatus 8 transmits the collection-target data 132 that is transmitted from each of the plural image forming apparatuses 3 to the management server 9. Each time, the collection-target data 132 that is transmitted to the management server 9 is also transmitted to the test server 10, the connection of which is received by the connection-receiving unit 83. Moreover, the command-relay unit 86 of the relay apparatus 8 transmits a command for an image forming apparatus 3 that is transmitted from the test server 10, the connection of which is received by the connection-receiving unit 83, to the image forming apparatus 3. Together with that, the command-relay unit 86 transmits a relayed command response that is received from an image forming apparatus 3 to the test server 10.

In this way, by providing a relay apparatus 8, the management server 9 does not need to relay to the test server 10, so the load on the management server 9 can be reduced. Moreover, by reducing the load, plural test servers 10 can be connected to the relay apparatus 8, and collection-target data 132 from an image forming apparatus 3 can be accumulated in plural test servers 10 and not only the management server 1. Furthermore, plural test servers 10 can be connected to the relay apparatus 8, and it is possible to transmit commands from the management server 1 or the plural test servers 10 to an image forming apparatus 3.

Incidentally, in typical technology, manually performing copying work of actual data is required, and copying is performed between the management server and the test server, which both have an independent database, respectively, so there is a possibility that consistency of the data in the copy destination database will be compromised. Moreover, even after actual data is copied to the test server, data that is collected from an image forming apparatus in a customer environment is accumulated in an operating management server, however, only the actual data of the management server is accumulated in the test server at the time of copying, and sufficient testing cannot be performed in some cases.

With the technology according to the present disclosure, a high-quality environment can be constructed.

The technology according to the present disclosure is not limited to the embodiments described above, and needless to say, various changes are possible within a range that does not depart from the gist of the present disclosure.

What is claimed is:
1. An operating management server that is connected via a network to an image forming apparatus that is registered as a management target, and that remotely manages the image forming apparatus, comprising:
   a control unit that functions as a data-collection unit that receives collection-target data from the image forming apparatus and accumulates the data in a database; and
   a connection-receiving unit that receives a connection with a test server comprising the same functions as the management server;
   wherein the control unit further functions as a data-relay unit that also transmits the collection-target data received by the data-collection unit to the test server, the connection of which is received by the connection-receiving unit.

2. The management server according to claim 1, further comprising:
   an operation unit that receives control instructions for the image forming apparatus;
   wherein
   the control unit further functions as
   a command-processing unit that, together with transmitting a command to the image forming apparatus based on the control instruction that is received by the operation unit, receives a response to the command from the image forming apparatus; and a command-relay unit that, together with relaying the command for the image forming apparatus that is transmitted from the test server, the connection of which is received by the connection-receiving unit, transmits the response to the command by the relaying received from the image forming apparatus to the test server.

3. The management server according to claim 2, further comprising:

a relay-setting unit that receives settings for activating or deactivating the functions of the data-relay unit and the command-relay unit, respectively.

4. The management server according to claim 3, wherein the relay-setting unit, when the function of the data-relay unit or the command-relay unit is set to be activated, transmits registration information in which the image forming apparatus is registered as a management target to the test server, the connection of which is received by the connection-receiving unit.

5. The management server according to claim 4, wherein the relay-setting unit, when the functions of the data-relay unit and the command-relay unit are set to be deactivated, requests the test server, the connection of which is received by the connection-receiving unit, to cancel the registration of the image forming apparatus registered as a management target based on the registration information in the test server.

6. The management server according to claim 2, wherein the control unit further functions as a syntax-conversion unit that has the syntax of the test server, and together with converting the command for the image forming apparatus from the test server to the syntax of management server, converts each of the collection-target data and the response from the image forming apparatus to the syntax of the test server.

7. The management server according to claim 1, wherein the test server is connected in multiple stages.

8. A test environment construction system comprising: plural image forming apparatuses that transmit collection-target data; an operating management server that, via a network, remotely manages the plural image forming apparatuses that are registered as management targets; a relay apparatus that is provided in a communication path between each of the plural image forming apparatuses and the management server; and a test server that comprises the same functions as the management server; wherein each of the management server and the test server comprises:

a controller that functions as a data-collection unit that receives the collection-target data from the image forming apparatuses and accumulates the data in respective databases; and an operation unit that receives control instructions for the image forming apparatuses;

each of the controllers further functions as a respective command-processing unit that, together with transmitting commands to the image forming apparatuses based on the control instructions received by the operation unit, receives responses to the commands from the image forming apparatuses;

the relay apparatus comprises:

a connection-receiving unit that receives a connection with the test server; and a controller that functions as a data-relay unit that transmits the collection-target data that is transmitted from each of the plural image forming apparatuses to the test server, the connection of which is received by the connection-receiving unit; and the controller of the relay apparatus further functions as a command-relay unit that, together with relaying the commands for the image forming apparatuses that are transmitted from the test server, the connection of which is received by the connection-receiving unit, transmits the responses to the commands by the relaying received from the image forming apparatus to the test server, the connection of which is received by the connection-receiving unit.

9. The test environment construction system according to claim 8, wherein the connection-receiving unit of the relay apparatus receives connections of each of plural test servers.

10. A test environment construction method performed by an operating management server that is connected via a network to an image forming apparatus that is registered as a management target, and that remotely manages the image forming apparatus, comprising the steps of:

receiving collection-target data from the image forming apparatus and accumulating the data in a database;

receiving a connection for a test server that comprises the same functions as the management server; and transmitting the received collection-target data to the test server, the connection of which is received.

* * * * *